W. A. LINK.
ANIMAL TRAP.
APPLICATION FILED MAR. 17, 1911.
1,050,220.
Patented Jan. 14, 1913.
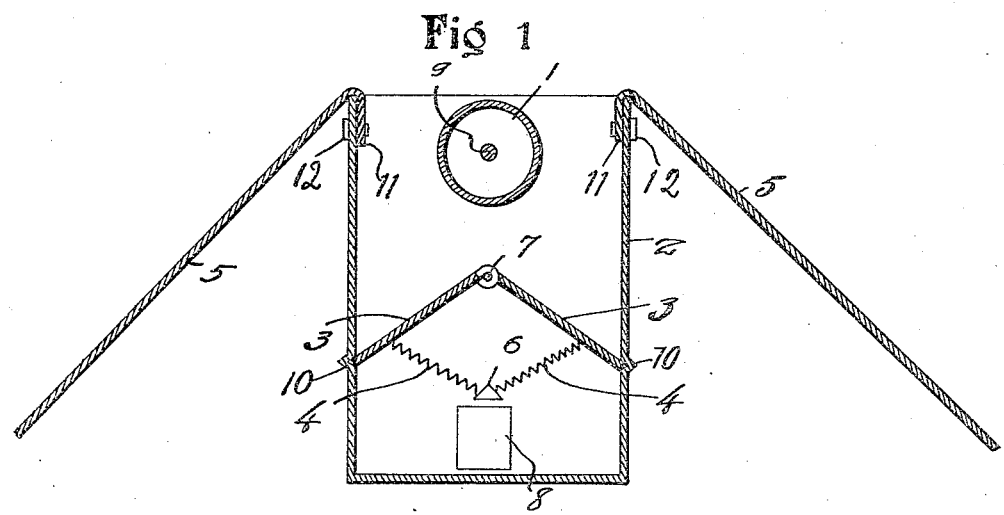
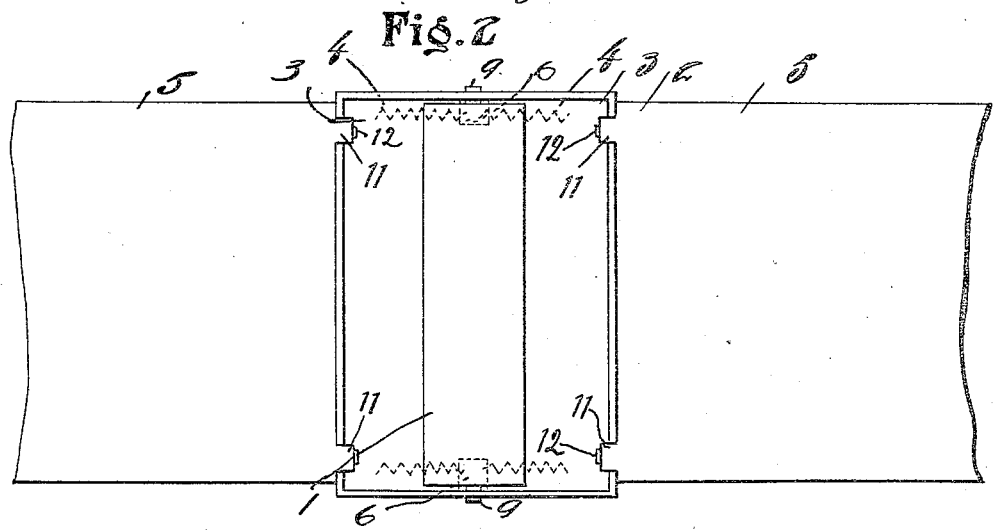
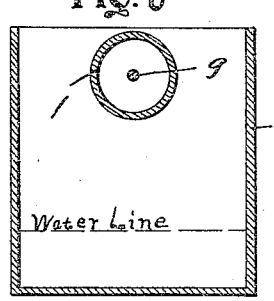
Witnesses
Inventor,
W·A·Link,
By A. L. Jackson,
Attorney

UNITED STATES PATENT OFFICE.

WILLIAM A. LINK, OF FORT WORTH, TEXAS.

ANIMAL-TRAP.

1,050,220.

Specification of Letters Patent.   Patented Jan. 14, 1913.

Application filed March 17, 1911.   Serial No. 615,150.

*To all whom it may concern:*

Be it known that I, WILLIAM A. LINK, a citizen of the United States, residing at Fort Worth, in the county of Tarrant and State of Texas, have invented certain new and useful Improvements in Animal-Traps, of which the following is a specification.

This invention relates to animal traps and particularly to traps for catching small animals, and the object is to provide simple and inexpensive traps which will be highly efficient in catching mice, rats and other animals. The machines or traps can be made large or small. For catching mice small traps can be provided and for catching rats larger traps may be provided. Such traps can be made large enough for catching dogs or wolves.

Other objects and advantages will be fully explained in the following description and the invention will be particularly pointed out in the claim.

Reference is had to the accompanying drawings which form a part of this application.

Figure 1 is a vertical section of the trap. Fig. 2 is a plan view of the same. Fig. 3 is a vertical section of a trap showing a variation.

Similar characters of reference are used to indicate the same parts throughout the several views.

This invention includes a box 2 and a cylinder 1 journaled in the ends of the box. The cylinder 1 must have the journals 9 in the exact longitudinal center so that the cylinder will remain in any position it may be left in and so that the cylinder will turn easily in either direction. The cylinder is preferably made of sheet metal and with a smooth surface. Below the cylinder 1 are located trap doors 3 pivoted on a rod 7 and held in their normal closed position by springs 4 which are seated on lugs 6 and attached to the doors. The sides of the box 2 may be creased at 10 so that the lower edges of the trap doors 3 will swing in the creases. The object of this construction is to place the lower edges of the doors behind a shoulder out of reach of an animal's claws so that the doors cannot be pulled downwardly by animals for escape.

The operation is simple. Bait is placed on top of the cylinder. Approaches 5 may be set against the sides of the box with the other ends resting on the ground or other convenient place. It is apparent that any suitable means may answer the purpose of the approaches 5. When an animal puts his feet on the cylinder it will be thrown instantly down in the box on one of the trap doors 3 which will yield and let it fall through into the box below the door. The door will be immediately restored to its normal position by the spring 4. The doors 4 swing easily on the hinge-rod 7. The surface of the cylinder 1 being smooth and the cylinder being sensitively balanced on its journals, the animal will be dumped into the trap before it knows anything, and the springs 4 will prevent its escape. A door 8 may be provided for removing animals from below the trap doors.

Instead of catching the animals below trap doors, water may be placed in the box below the cylinder. The cylinder will dump the animals in the water and they cannot escape.

The cylinder 1 will be somewhat deceptive to the animals. The first effort will be that the animal will instinctively try to cling to the cylinder when it starts to turn. While it is trying to cling to the cylinder, it will be dumped below because the cylinder will turn easily and by the slightest increase of weight on one side.

In order that the approaches will always be in place, each approach 5 is provided with tongues 11 which lap over the upper edge of the box 2 and are secured there by bolts or rivets 12.

Having fully described my invention, what I claim as new and desire to secure by Letters Patent, is,—

A trap comprising a box, a cylinder journaled in said box, and spring trap doors pivotally mounted below said cylinder and inclined toward their free edges, said box having creases in the sides to receive the lower edges of said trap doors.

In testimony whereof, I set my hand in the presence of two witnesses, this 13th day of March, 1911.

W. A. LINK.

Witnesses:
  A. L. JACKSON,
  A. A. HENDERSON.